Nov. 25, 1958  G. D. LEWIS  2,861,420
FUEL REGULATOR

Filed March 20, 1953  2 Sheets-Sheet 1

INVENTOR
GEORGE D. LEWIS
BY
ATTORNEY

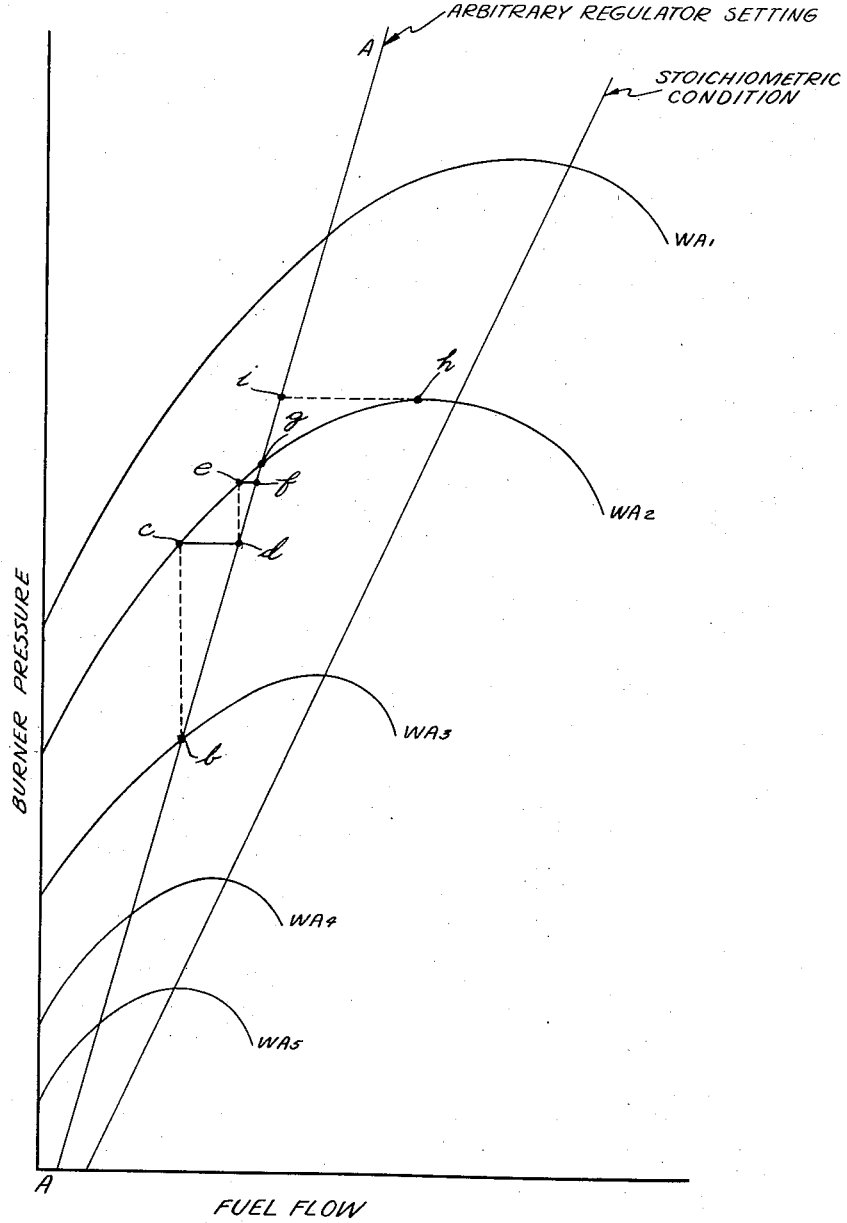

United States Patent Office 2,861,420
Patented Nov. 25, 1958

2,861,420

FUEL REGULATOR

George D. Lewis, Manchester, Conn., assignor to United Aircraft Corporation, East Hartford, Conn., a corporation of Delaware Application March 20, 1953, Serial No. 343,558

13 Claims. (Cl. 60—35.6)

This invention relates to ramjet power plants and more specifically to fuel regulating means therefor.

It is an object of this invention to provide a fuel control for a ramjet power plant which is accurate but yet extremely simple.

It is a further object of this invention to provide a fuel control of the type described which in its primary form requires only one major movable part and which can be readily adjusted or calibrated.

These and other objects of this invention will become readily apparent from the following detail description of the drawing in which:

Fig. 3 illustrates typical operating curves for a ramjet.

Many methods have been devised to regulate the flow of fuel to ramjet engines. The more common types use static and/or total air pressures upstream of the combustion chamber to determine the air flow and provide a corresponding fuel flow. One source of error and complexity common to all these types is that produced by variations in inlet air temperature. The maximum inlet air temperature variation anticipated for missile flight conditions is from 708° R. at Mach number 2 and 40,000′ altitude to 1540° R. at Mach number 3 at sea level or a variation of 117 percent.

This invention uses the exhaust nozzle of the engine as an air flow measuring device and the static pressure existing at the upstream end of that nozzle as a means of controlling fuel flow.

The gas flow through the exhaust nozzle can be represented by the equation:

$$W = \rho A V = \frac{PA}{RT} \times \sqrt{\gamma g R T} = PA \sqrt{\frac{\gamma g}{RT}}$$

where $W$=gas flow, $\rho$=gas density, A is the cross sectional area of the exhaust nozzle throat, P is the static pressure at the nozzle throat, T is the static temperature at the nozzle throat, R is the gas constant, g is the gravitational constant and $\gamma$ is the ratio of specific heats. It can be shown that a ramjet engine having approximately 100 percent combustion efficiency at stoichiometric fuel-air ratio and sonic velocity at the throat of the exhaust nozzle, will produce a pressure at the inlet to the exhaust nozzle that is directly proportional to the weight flow of combustion gas and hence directly proportional to the required fuel flow. In short, the engine exhaust nozzle static pressure can be used to govern the fuel flow.

Figure 1:
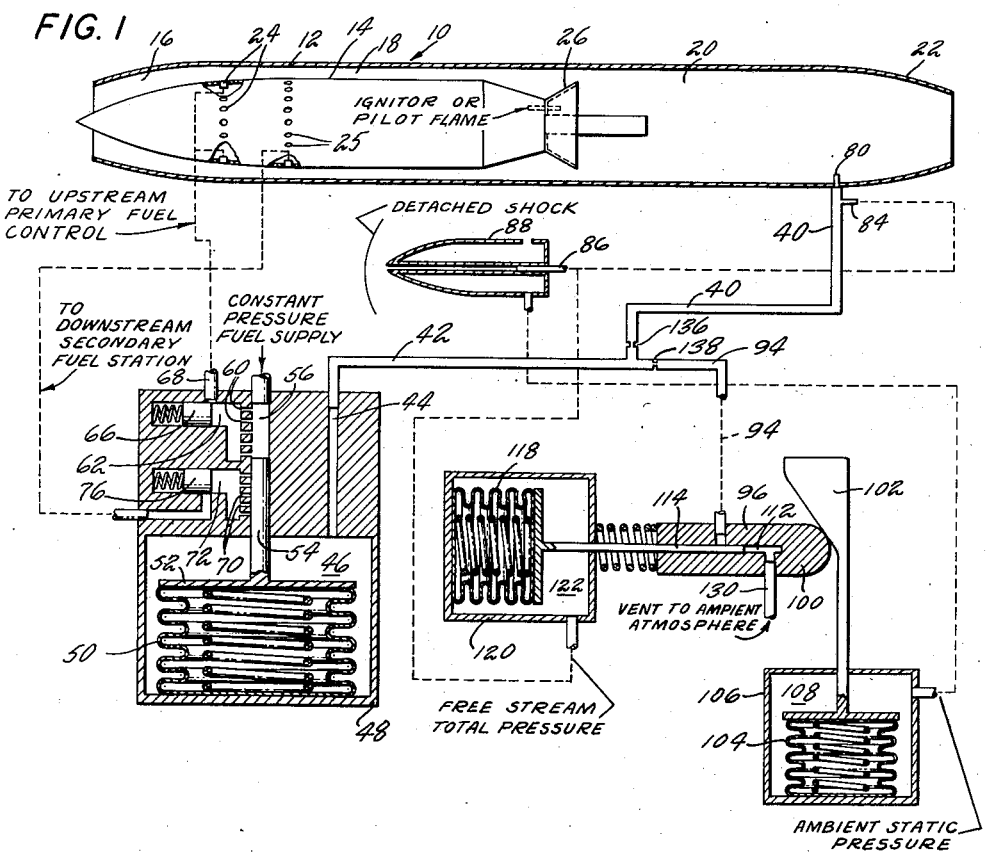
Fig. 1 is a schematic illustration of a ramjet power plant having a fuel regulator according to this invention including a Mach number limiting device for the vehicle to be propelled.

A simple, light and reliable method of providing a fuel flow directly proportional to the burner pressure is shown in Fig. 1. There are large advantages of this method of fuel regulation over those types using total and/or static air pressures upstream of the combustion zone to determine air Mach number and density and hence air mass flow.

First the flow is measured with a sonic velocity nozzle an inherently accurate method. Second, the effects of variation in inlet air temperature are minimized since the temperature is raised to about 4200° R. by the combustion process making the maximum possible difference of 832° R. previously noted a much smaller percent of the exhaust temperature than of the inlet temperature. Moreover, the temperature appears in the equations governing gas flow through a choked nozzle as a square root function thus reducing the maximum possible error in fuel regulation due to anticipated variations in Mach number and ambient air temperature to approximately plus or minus 4 percent.

Referring to Fig. 1, a ramjet power plant is generally indicated at 10 which power plant, as shown, can be a vehicle such as a missile. The power plant 10 comprises an outer casing 12 and an inner body 14 between which is defined an annular air passage. The power plant is generally composed of a diffuser section 16, a mixing section 18, a combustion section 20 and an exhaust nozzle 22. Fuel may be introduced through a plurality of primary fuel nozzles 24 and another group of fuel nozzles 25 for introducing secondary fuel at a downstream location. An annular conical flange 26 is provided to form a flameholder with an igniter or a pilot flame being provided on the shielded side of the flange 26 to ignite the fuel-air mixture passing thereover. The fuel-air mixture is burned in the combustion section 20 and is exhausted through the nozzle 22.

As mentioned above an accurate means for measuring the mass flow and consequently the desired fuel flow may be obtained by utilizing the pressure existing adjacent the upstream end of the exhaust nozzle 22. To this end a line 40 leads from adjacent the upstream end of the exhaust nozzle 22 to the line 42, passageway 44 and into the chamber 46 defined by the fuel regulator casing 48. The casing 48 contains an evacuated bellows 50 which has its movable wall 52 fixed to a reciprocating valve stem 54 which in turn fits into a bore 56. A plurality of openings 60 are provided in the bore 56 so that as the valve stem 54 moves downwardly as a result of increased pressure in the chamber 46, a greater amount of fuel will flow into the chamber 62. Chamber 62 is operatively connected to the primary fuel nozzles 24, as shown. A spring biased check valve 66 may be provided so as to automatically vary the opening of passage 68 and maintain the fuel pressure drop through the regulator approximately constant under varied fuel flow conditions. A second set of passages 70 are provided in the bore 56 to permit a greater volume of fuel flow when required. The fuel flow through the passages 70 leads to chamber 72 and thence to the secondary fuel nozzles 24, as shown. Another check valve 76 may be provided for the secondary flow in the same manner as provided for the primary flow of fuel.

A fusible plug 80 might be provided in the line 40 so that no pressure sensing takes place until the ramjet power plant has ignited and the temperatures therein have risen sufficiently to melt the fusible plug.

In order to provide the fuel regulator with some pressure during starting a small tap 84 is provided in the line 40 which tap is connected to the total pressure line 86 of a Pitot static tube 88. The Pitot static tube 88 will sense total free stream pressure behind the detached shock and this total pressure will be a function of the Mach number of the relative free stream. Hence, for example, when a Mach number of 2 is reached, sufficient pressure will be obtained in the line 86, lines 84, 40 and 42 so that the pressure in chamber 46 will be sufficient to move the bellows 50 downwardly to permit a flow of fuel via the passages 60 to the primary fuel nozzles 24. The tap 84 in the line 40 is made relatively small so that once the fusible plug 80 has melted and the pressure adjacent the nozzle is being sensed by the line 40, the effect of the total free stream pressure being admitted via the tap 84 will be negligible.

For a better understanding of the operation of the regulator, Fig. 3 shows typical curves for ramjet operation with the plot illustrating combustion chamber pressure vs. fuel flow for a number of arbitrary airflows. The line A—A represents one pressure vs. fuel flow calibration of the regulator. This is only one of an infinite number of similar regulator performance curves.

The calibration of the regulator is achieved by matching the spacing of holes 60 and 70 (Fig. 1) to the constant of the spring in bellows 50. The line A—A can be curved or have a varied configuration depending on the pattern of holes 60 and 70 and the type of spring.

Assume the engine and regulator to be operating at point (b) with an airflow $WA_3$. If the airflow suddenly increases to $WA_2$, the engine will be operating at conditions at point (c). The regulator, responding to that burner pressure will supply a fuel flow corresponding to point (d) which, at an airflow of $WA_2$, will make the operating condition as indicated by point (e). Since this point is still not on the regulator design line A—A, the regulator will respond to the existing burner pressure and supply more fuel as indicated by point (f). This increased fuel slightly increases the burner pressure, and the process is repeated until burner and regulator settle out at point (g).

Conversely, if burner and regulator are operating smoothly at point (g) and an arbitrary extra amount of fuel is momentarily supplied changing conditions to point (h), the regulator, responding to the new burner pressure, will supply fuel indicated by point (i) which is a lower fuel rate than at point (h) and, following the process described above, will finally settle out at point (g). The operation of this regulator has been proven in actual tests.

In order to limit the particular vehicle and the power plant to a design Mach number a Mach limiting device is provided. To this end the line 40 has connected thereto a line 94 which leads to a valve 96. The operation of the valve 96 is dependent upon the coordinated movement of two elements which cooperate so that when a given Mach number is attained the line 94 will be vented to ambient atmospheric static pressure so as to reduce the pressure in chamber 46 of the fuel regulator thereby tending to reduce fuel flow. The valve 96 comprises a movable cylinder 100 which engages a cam 102. The cam 102 is operatively connected to an evacuated bellows 104 which is surrounded by a casing 106 to form a chamber 108. The chamber 108 is operatively connected to the static pressure tap of the Pitot tube 88 which static pressure will be that of the free airstream. The cam 102 is contoured to provide the desired variation of limiting Mach number with altitude.

The valve cylinder 100 includes a passage 112 which receives a reciprocable stem or piston 114. The piston 114 is operatively connected to an evacuated bellows 118 which is surrounded by a casing 120 to form a chamber 122. The chamber 122 is operatively connected to the total pressure line of the Pitot tube 88 so that as pointed out above the chamber 122 will be subject to a pressure which is a function of the Mach number of the relative airstream. As a result the cylinder 100 and the piston 114 will cooperate so that as the limiting Mach number is approached, the line 94 will be connected to the bore 112 and the line 130 which is vented to the ambient static pressure.

The lines 40 and 94 each include an orifice 136 and 138, respectively, of predetermined areas. The ratio of the areas of these orifices determines the lean fuel-air ratio stop of the Mach limiting mechanism independent of altitude and the limiting Mach number. In other words, when valve 100 opens sufficiently to provide a choking pressure drop across both orifices 136 and 138, then the pressure in chamber 46 will be isolated (by sonic flow in 138) from any further action of valve 100 and will be a predetermined percent of the pressure in chamber 20 (as a result of sonic flow in 136). Since the ratio of pressure in 46 to the pressure in 20 corresponds directly to a fuel-air ratio provided by the regulator, this device allows the Mach limiter to reduce the fuel-air ratio until this limiting pressure ratio is reached and then divorces the action of the Mach limiter from further effect on the regulator.

The Mach limiting device described herein may also be of the type shown and described in patent application Serial No. 336,746, for Variable Bleed Diffuser, filed February 13, 1953, by George F. Hausmann.

The fuel regulator described above in itself may be adjusted so as to provide a predetermined fuel-air ratio regardless of altitude between, for example, Mach numbers 2 and 3. Thus the spacing of the passages 60 in bore 56 or the characteristics of the spring which biases the bellows 50 may be changed to provide the desired response. To this end then the fuel regulator has further utility in a system such as is schematically illustrated in Fig. 2.

Figure 2:
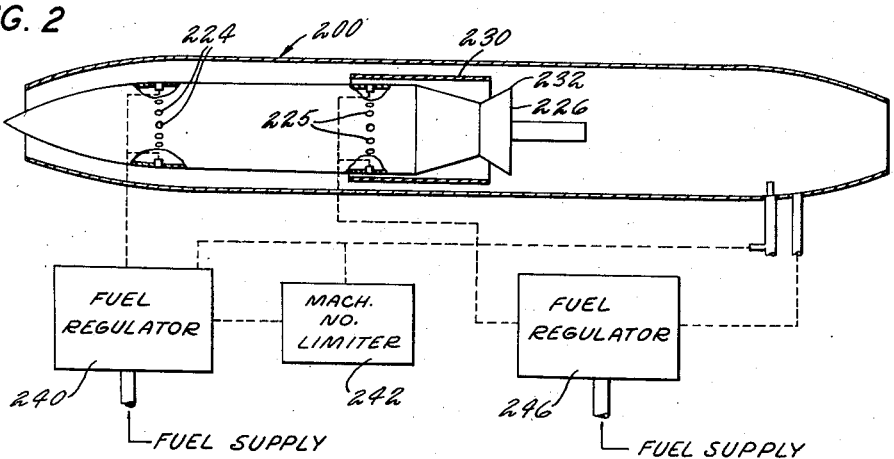
Fig. 2 is a schematic illustration of a similar system utilizing a second fuel regulator.

Referring to Fig. 2, a ramjet 200 is illustrated which is primarily identical to that illustrated in Fig. 1. The usual primary fuel nozzles 224 are provided as are the secondary fuel nozzles 225. The secondary fuel nozzles 225 are however surrounded by an annular sleeve 230 for confining the secondary fuel flow and air mixture within the sleeve so that it is directed adjacent to the lip 232 of the flamespreader 226. As illustrated, a fuel regulator 240 may be provided to regulate the fuel to the primary nozzles and a Mach limiting device 242 may also be provided. The fuel regulator 240 and the Mach limiter 242 are identical to that illustrated and described in connection with Fig. 1. The first fuel regulator 240 and the second fuel regulator 246 are connected to the nozzle by separate lines so that the effect of the Mach limiter on 240 will not affect 246. The second fuel regulator 246 is identical to the fuel regulator 240 and is so adjusted that fuel-air ratio of for example .067 will be maintained. Thus with the Mach number limiter in operation tending for example to reduce fuel flow, the fuel regulator 46 will maintain the fuel flow within the sleeve 230 approximately at the fixed ratio so as to insure that a continuous flame will be maintained downstream of the flamespreader. In other words, should the primary flow be reduced excessively, a flameout may occur. However, by providing adequate fuel-air mixture over the lip of the flamespreader a continuous flame is provided.

It should be pointed out that the fuel regulators 240 and 246 each respond to pressure adjacent the exhaust nozzle for regulating the fuel flow.

It will be apparent that as a result of this invention a simple yet automatic fuel device has been provided which requires a minimum of movable parts without the need of additional servo mechanisms. The primary fuel regulator furthermore contains only one major moving part.

Although only certain embodiments of this invention have been illustrated and described herein, it will be apparent that various changes and modifications may be made in the construction and arrangement of the various parts without departing from the scope of this novel concept.

What it is desired to obtain by Letters Patent is:

1. In a ramjet power plant having a combustion chamber, an exhaust nozzle receiving gases from said combustion chamber and normally operating with fluid of sonic velocity at the throat of the nozzle, a source of fuel under pressure, a valve controlling the flow of fuel from said source to said combustion chamber, means for regulating said valve comprising a pressure responsive device, a passage operatively connecting said device to a point internally of the power plant and adjacent said nozzle to provide an operating pressure therefor, and a source of pressure operatively connected to said device to provide another operating pressure therefor during starting of the power plant.

2. In a ramjet according to claim 1 wherein said passage includes a thermosensitive device responsive to the temperature of the fluids adjacent said nozzle operative to open said passage upon an increase in temperature of the fluids in the nozzle.

3. In a ramjet power plant according to claim 2 including means responsive to the relative Mach number of the free airstream for venting said passage.

4. In a ramjet power plant according to claim 1 including means responsive to the relative Mach number of the free airstream for venting said passage.

5. In a power plant having a combustion chamber, a nozzle receiving gases from said combustion chamber, a source of fuel under pressure, means for regulating the flow of fuel from said source to said combustion chamber, means responsive to one source of pressure for controlling said regulating means during starting, and means responsive to a perssure in the power plant adjacent said nozzle for normally controlling said regulating means including a temperature responsive device for permitting said last mentioned controlling means to dominate in control.

6. In a power plant having a combustion chamber, a nozzle receiving gases from said combustion chamber, a source of fuel under pressure, means for conducting fuel under pressure from said source to said combustion chamber, means for controlling the amount of fuel flowing to said combustion chamber comprising a movable element responsive to the pressure in said power plant adjacent said nozzle, a flamespreader in said combustion chamber, primary fuel nozzle means upstream of said flamespreader operatively connected to said fuel control means, secondary fuel nozzle means downstream of said primary fuel nozzle means and located adjacent said flamespreader, and means for controlling the amount of fuel to said secondary fuel nozzle means consisting of a movable element responsive to the pressure in said power plant adjacent said nozzle.

7. In a power plant according to claim 6 including a Mach number responsive device operatively connected to said first mentioned fuel control means for limiting the fuel flow to said primary nozzle means.

8. In a ramjet power plant having a combustion chamber, a nozzle receiving gases from said combustion chamber, said nozzle having a throat with gases of sonic velocity therein during operation, a source of fuel under pressure, means for conducting fuel from said source to said combustion chamber, means for controlling the amount of fuel flow consisting of a movable element responsive to the pressure in said power plant adjacent said nozzle, a Mach number responsive device operatively connected to said fuel controlling means for limiting the fuel flow to said combustion chamber, a flamespreader in said combustion chamber, means for igniting the combustible fluids adjacent said flamespreader, primary fuel nozzle means upstream of said flamespreader operatively connected to said fuel control means, secondary fuel nozzle means downstream of said primary fuel nozzle means and located adjacent said flamespreader, and means for controlling the amount of fuel to said secondary fuel nozzle including means consisting of a movable element responsive to the pressure in said power plant adjacent said nozzle.

9. In a ramjet power plant having a combustion chamber, a nozzle receiving gases from said combustion chamber, said nozzle having a throat with gases of sonic velocity therein during operation, a source of fuel under pressure, means for conducting fuel from said source to said combustion chamber, means for controlling the amount of fuel flow comprising a movable element responsive to the pressure in said power plant adjacent said nozzle, and a Mach number responsive device operatively connected to said fuel controlling means for limiting the fuel flow to said combustion chamber, a flamespreader in said combustion chamber, means for igniting the combustible fluids adjacent said flamespreader, primary fuel nozzle means upstream of said flamespreader operatively connected to said fuel control means, secondary fuel nozzle means downstream of said primary fuel nozzle means and located adjacent said flamespreader, means for controlling the amount of fuel to said secondary fuel nozzle, and means for regulating said controlling means comprising a movable element responsive to the pressure in said power plant adjacent said nozzle.

10. In a power plant having a combustion chamber, an exhaust nozzle receiving gases from said combustion chamber and normally operating with fluid of sonic velocity at the throat of the nozzle, a source of fuel under pressure, means for regulating the flow of fuel from said source to said combustion chamber, means for controlling said regulating means comprising a pressure responsive device, first passage means operatively connecting said pressure responsive device to a point internally of the power plant and adjacent said nozzle to provide an operating pressure therefor, a Mach number responsive device operatively connected to said regulating means for limiting fuel flow to said combustion chamber, second passage means operatively connecting said Mach number responsive device to said first passage means, and orifice means in said first passage means for providing a lean fuel-air ratio limit.

11. In a power plant having a combustion chamber, an exhaust nozzle receiving gases from said combustion chamber and normally operating with fluid of sonic velocity at the throat of the nozzle, a source of fuel under pressure, means for regulating the flow of fuel from said source to said combustion chamber, means for controlling said regulating means comprising a pressure responsive device, a passage operatively connecting said pressure responsive device to a point internally of the power plant and adjacent said nozzle to provide an operating pressure therefor, a Mach number responsive device operatively connected to said regulating means for limiting fuel flow to said combustion chambers, passage means operatively connecting said Mach number responsive device to a point internally of said power plant and adjacent said nozzle, and means providing a separate source of pressure for said devices during starting of said power plant.

12. In a power plant having a combustion chamber, a nozzle receiving gases from said combustion chamber, a source of fuel under pressure, means for conducting fuel under pressure from said source to said combustion chamber, first means for controlling the amount of fuel flowing to said combustion chamber comprising a movable element responsive to the pressure in said power plant adjacent said nozzle, a flamespreader in said combustion chamber, primary fuel nozzle means upstream of said flamespreader operatively connected to said first fuel control means, secondary fuel nozzle means downstream of said primary fuel nozzle means and located adjacent said flamespreader, and second means for controlling the amount of fuel to said secondary fuel nozzle means comprising a movable element responsive to the pressure in said power plant adjacent said nozzle.

13. In a power plant according to claim 12 including a sleeve dividing said combustion chamber into two annular passages, whereby said secondary nozzles inject fuel into only one of said passages.

References Cited in the file of this patent

UNITED STATES PATENTS

| | | |
|---|---|---|
| 2,545,815 | Klinge | Mar. 20, 1951 |
| 2,592,385 | Borden et al. | Apr. 8, 1952 |
| 2,642,237 | Page et al. | June 16, 1953 |
| 2,697,327 | Hazen et al. | Dec. 21, 1954 |